April 28, 1931.     A. E. YOUNG     1,803,085
MEASURING APPARATUS
Filed Feb. 4, 1930     2 Sheets-Sheet 1
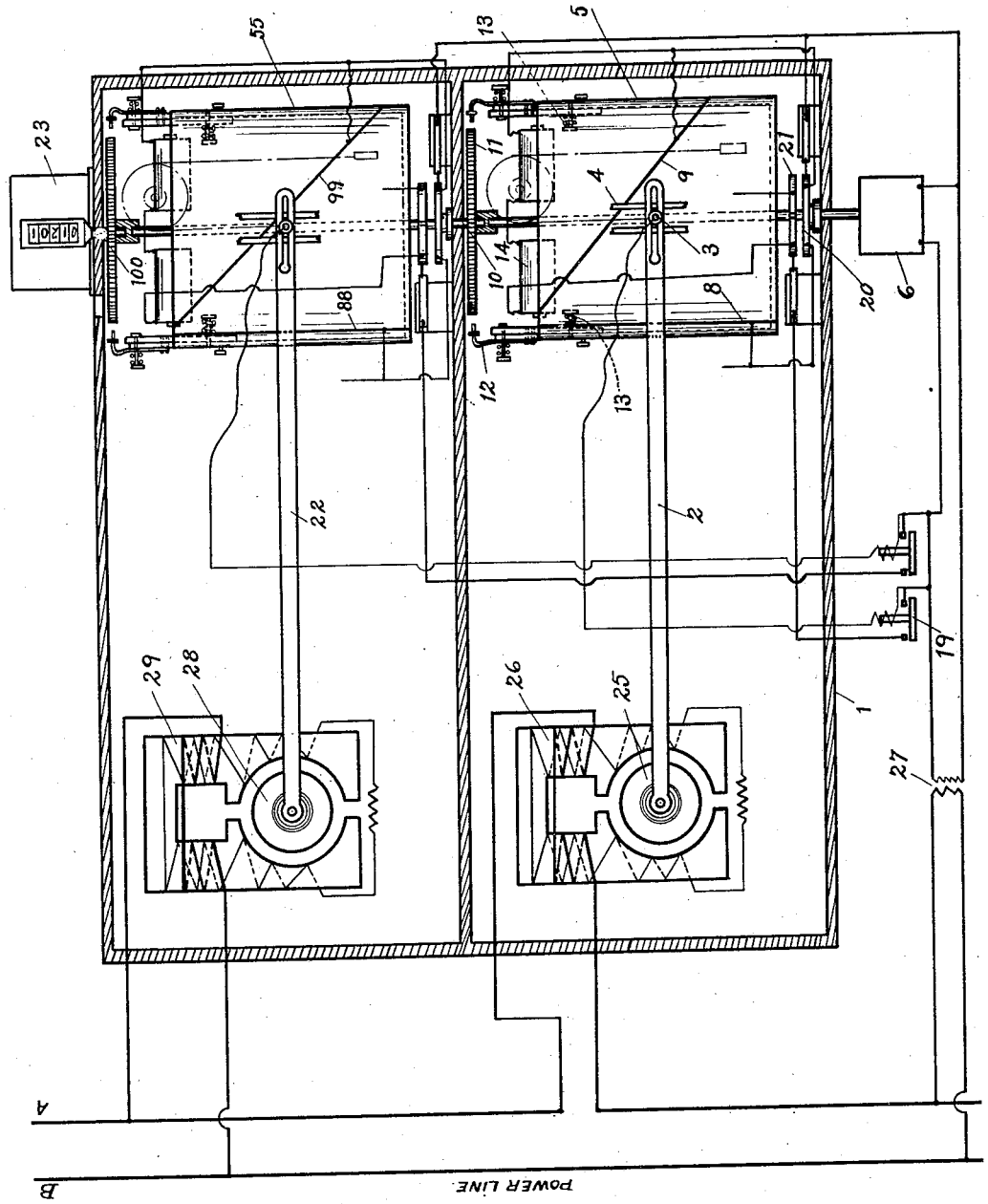
Fig. I
INVENTOR
Archer E. Young
by Christy Christy and Wharton
his attorneys

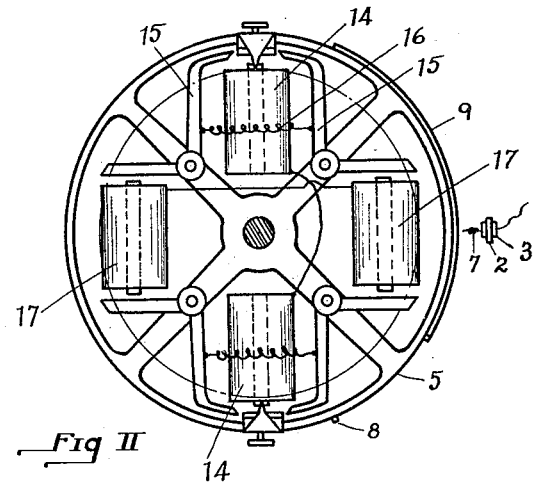
Fig II
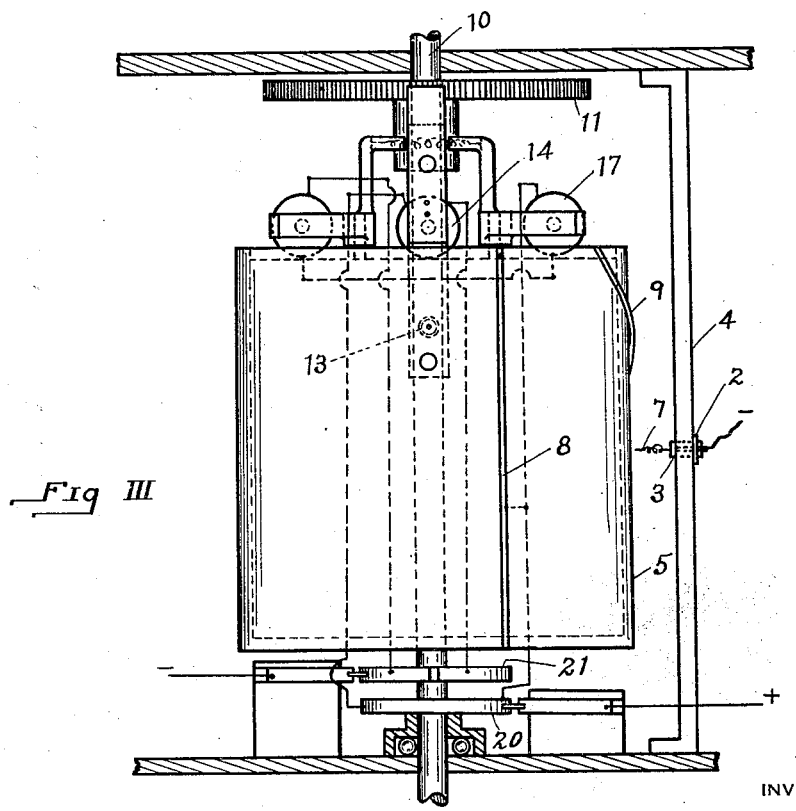
Fig III

Patented Apr. 28, 1931

1,803,085

UNITED STATES PATENT OFFICE

ARCHER E. YOUNG, OF PITTSBURGH, PENNSYLVANIA

MEASURING APPARATUS

Application filed February 4, 1930. Serial No. 425,773.

My invention relates to the measurement of electric energy and consists in apparatus for aggregating in a tally the quantity of energy which in an interval of time has been delivered by a supply line. Electric energy is measured quantitatively in watts, and the apparatus of my invention is a watt meter.

A watt meter of my invention is illustrated in the accompanying drawings. Fig. I is a view partly in section, partly in elevation of an instrument of my invention. In this figure the wiring is indicated diagrammatically. Fig. II is a view to larger scale, showing in end elevation one of the rotary members which form part of the organization; Fig. III is a fragmentary view in section, and showing in side elevation the same rotary member, with greater elaboration of detail than appears in Fig. I.
A supply line for electric energy is indicated at A, B. This may be understood to be a line carrying an alternating current. Associated with the line A, B is a casing 1, within which a long lever 2 is pivoted. This lever is borne by the rotatable armature 25 of a motor 26 which is energized by the current carried by the line A, B. The turning of the armature and the consequent swinging of the lever will be responsive to variation in amperage, that is to say to the strength of the current flowing in the line A, B.

The lever 2 at its distal end is slotted longitudinally and carries, freely reciprocable in the slot, a block 3. Block 3 is engaged also by a guideway 4 which extends transversely to the length of arm 2. As the arm 2 swings in response to variation in the strength of the current flowing in the line A, B, block 3 will move up and down in guideway 4, and, the arm being relatively long and the organization of the motor 26 being such that within the limits of ordinary operation the angular range of rotation is small, the movement of block 3 along the guideway will always be closely proportional to the variation in current strength. If it were a matter of direct reading of the position of the block along the guideway, as an indication of current strength, the inaccuracy, due to the fact that the right-line movement of the block is not minutely proportional to the angular swing of the lever, would be inconsiderable; but, by virtue of the fact that the block cooperates with other mechanical parts, proportions of certain other parts may be so far modified and adapted as practically to eliminate even such slight and relatively inconsiderable inaccuracy.

In proximity to, and in parallelism with the course of block 3 in its guideway, extends a constantly and uniformly advancing surface. In the particular instrument here illustrated, this surface is the surface of a cylinder 5, mounted for rotation on an axis parallel with guideway 4 and rotated at constant speed by suitable means, in this case the clockwork 6. Block 3 may be understood to be equipped with a brush which extends adjacent the surface of cylinder 5, and the surface of the cylinder is provided with insulating areas and conducting strips or lines so disposed that cylinder rotation will effect the periodic making and breaking of an electric circuit or electric circuits. Conveniently the cylinder surface, otherwise insulating, carries strips or lines 8 and 9 of conducting material. Strip 8 extends longitudinally upon the surface of the cylinder and parallel with its axis, and strip 9 is so particularly shaped and disposed that at successive points longitudinally of the cylinder the distance between the strips, measured circumferentially, is proportional to the distance at which block 3, ranging longitudinally of the cylinder, is remote from a zero point. With reference to the instrument of the drawing, the strips 8 and 9, being prolonged, would meet at or near the upper end of the cylinder. When current strength in the line A, B is zero, there is of course no flow; and, while that condition obtains, the lever 2 is in a position upwardly inclined from left to right, and the brush 7 which the block 3 bears is just free of contact with the strips 8 and 9 at the point of their meeting or of their closest approach. As current begins to flow in the line A, B and as amperage increases from zero through the range of service value, the lever 2 swings clockwise, and the block 3 moves from its zero point downward along the guideway 4; and the strips 8 and 9 are so relatively situated that the distance between them, circumferentially measured, is proportional to the distance at which the block 3 stands remote from the zero point. It will be understood that in this particular also the drawing is diagrammatic; no attempt has been made so to plot the positions of the strips as to render the drawing a literal presentation of the equation stated. I have alluded to the fact that the range of travel of block 3 along its guideway is not minutely proportional to the angular swing of lever 2. In the minute placement of the strips 8 and 9 there is opportunity for compensation, so that at every position of the block the space interval between the strips shall be the accurate expression of current strength, according to a predetermined standard.

A shaft 10 is mounted for rotation coaxially with cylinder 5. Shaft 10 carries integrally a clutch member, in the form of a disk 11. Cylinder 5 carries one or more clutch members, in the form of swinging arms 12 which extend longitudinally beyond the head of the cylinder and opposite the face of disk 11. The arms may be swung to and from engagement with the disk. The face of the disk and the outer ends of the arms are suitably adapted to serve the clutch purposes indicated. To such end, the face of the disk may be serrated, and the arms may terminate in teeth adapted to enter and to be withdrawn from engagement with the serrations. Such minute shaping of the parts is indicated in the drawings. Conveniently there are two arms 12, arranged in diametrically opposite positions, on cylinder 5. Normally the arms 12 are held by springs 13 retracted and free from engagement with the disk, and from such position they are swung inwardly, against the tension of the springs, by means of electro-magnets 14. The magnets 14 are borne by cylinder 5 and are so situated that, when energized, they attract and draw the arms inward. To this end the arms 12 are formed of, or carry blocks of, magnetic material.

Cooperating with the arms 12 are spring latches 15, borne also by cylinder 5. When by the energizing of electro-magnets 14 the arms 12 are swung inward to clutch-closing position, the latches 15, which under tension of springs 16 had been bearing laterally upon the sides of the arms, spring to place behind the arms, and hold them secure in clutch-closing position. A second pair of electro-magnets 17 is provided, borne also by cylinder 5, and so arranged that, when energized (in alternation with the energizing of magnets 14), they will be effective to swing the latches 15, against the tension of springs 16, from the latching position to which in consequence of the action of electro-magnets 14 they had swung, to unlatching position; and then the arms 12, freed of restraint, will swing again, under tension of their springs 13, to the position of clutch release. By such provision shaft 10 is caused to rotate in unison with the motor-driven cylinder 5, so long as the clutch is closed. When the clutch is open, shaft 10 is at rest.

The small amount of electric energy required for energizing the electro-magnets 14 and 17 may be derived from any suitable source. I have shown it to be derived, as it may as a matter of convenience be derived, from the circuit A, B, through a transformer 27. A relay is indicated at 19; and collector rings 20 and 21 are indicated, borne by and insulated upon the shaft of cylinder 5. The ring 20 is complete and continuous; the ring 21 is composed of two arc-shaped parts, insulated one from the other. The wiring, the contact blocks, and the brushes do not require detailed enumeration. It should, however, be remarked of collector ring 21 that one portion is electrically connected with the coils of magnets 14 and the other portion with the coils of magnets 17.

When in the course of cylinder rotation the brush 7 with which block 3 is equipped makes contact with strip 8, relay 19 is first operated, and then immediately current in greater strength is caused to flow through magnets 14, energizing them; and the clutch is closed. The latches 15 close automatically behind the closing clutch arms 12. The electro-magnets 14, when they have so performed their part in the operation of the instrument, become immediately de-energized again, by the advance of the block-borne brush 7 from contact with the strip 8. The clutch, however, continues in closed position, being secured by the latches 15, and shaft 10 continues to rotate in unison with cylinder 5. In the further progress of operation, the brush 7 makes contact with strip 9, the relay 19 again is closed, and again immediately an energizing current flows, this time through electro-magnets 17. The energizing of the magnets 17 effects the swinging of the latches 15; and the clutch arms 12 then, released from restraint, swing under spring tension outward. The clutch is opened, and shaft 10 stops. The electro-magnets 17 in their turn, after performing their office, are at once de-energized by the continued turning of cylinder 5 and the breaking of the contact of brush 7 with strip 9.

The purpose of relay 19 is to prevent sparking, as the brush 7 makes contact successively with strips 8 and 9.

It will be perceived that with every rotation of the cylinder 5 the shaft 10 turns through a fraction of a complete rotation, and that the value of that fraction will be greater or less, according to the position of block 3 in its guideway 4 and according to the circumferential range of brush 7 upon the surface of cylinder 5 as the strips 8 and 9 pass beneath the brush. That range, as has been stated, is proportional to the variation in strength of the current flowing in circuit A, B. The extent of rotation of shaft 10 then, within any given interval of time, is an expression of the quantity of electric energy assuming constant voltage which during that interval has passed through the circuit. And it is apparent that, if a tally were driven directly by shaft 10, a suitable proportioning of parts would suffice to afford a correct reading of the quantity of electric energy which has passed, neglecting change of voltage.

The accuracy of such a reading would be conditioned, however, by the constancy of the potential under which the current flow continued. And if there be variation in potential, the quantity of energy passing will vary directly with it. I have perceived that, not only may I employ a device, the duplicate of that already described, to express in the angular extent of the turning of a shaft, the quantity of electric energy delivered under varying conditions of voltage (on the assumption that current strength is constant), but I have further perceived that if I mount upon the shaft 10 of the apparatus already described a second cylinder, and if with like instrumentalities I drive intermittently from such second cylinder a second shaft, and if I make the variable in the operation of such second set of instrumentalities responsive to variation in voltage in the line A, B, I shall have, in the extent of the rotation of such second shaft, an expression of the quantity of electrical energy transmitted through the line under varying current strength, corrected for variation in voltage, as well as current. That is to say, I shall have a watt meter.

Turning again to Fig. I of the drawings, a second device, essentially identical with that already described, will be seen to be mounted upon the first. The cylinder 55 of this second device is integrally borne upon the driven shaft 10 of the first. The lever 22 of the second device is borne by the rotating armature of the motor 29, and motor 29 is so connected in the circuit A, B, that variations in voltage express themselves in a turning of armature 28. The arrangement of the contact strips 88 and 99 upon the cylinder of the second device may be understood to be such that for each rotation of drum 55 the shaft 100 turns through an angle which varies in value, proportionately to the variation in voltage.

When the two devices are so organized the shaft 100 will turn through an angle whose value will be accurately indicative of the quantity of electric energy passing in the line A, B, under conditions both of current strength and of voltage, of which either or both may be variable. If then shaft 100 be caused to drive a tally 23, it is merely a matter of the proportioning of parts to obtain direct reading of watts.

It may be a matter of convenience to drive the motor for cylinder 5 electrically. I have described the motor 6 to be a piece of clockwork. Alternatively, it may be an electric motor, and in Fig. I I have diagrammatically indicated a circuit by which, if the motor were indeed an electric motor, it might be driven.

I have said that the arrangement diagrammatically shown in Fig. I is suitable for use in connection with a line carrying an alternating current. Should the line be a direct-current line, the instrument would be adapted for service merely by adapting the motors 26 and 29 in known manner to this changed condition.

I claim as my invention:

1. An electric meter including, in combination with an electric circuit, a movable member, means for moving the said member through a distance which in a given interval of time is greater or less, according to variation in one condition of the flow of electric current in such circuit, a block movable along a pathway transverse to the direction in which the said member moves, means for causing the said block to move along such pathway in response to variation in another condition of the flow of electric current, and a second movable member, the movable member first named and the block being provided with co-operating means effective throughout a greater or less portion of a unit of travel of the movable member first named, according to the position of the said block along its pathway, for moving the second movable member.

2. An electric meter including, in combination with an electric circuit, a movable member, a block movable along a pathway transverse to the direction in which said member moves, means for causing said block to move along such pathway in response to variation in one of the conditions of current flow in said circuit, a second movable member, the movable member first named and the said block being provided with co-operating means effective throughout a greater or less portion of a unit of travel of the movable member first named, according to the position of the said block along its pathway, and adapted to impart movement to the second movable member, a second block movable along a pathway transverse to the direction of the movement of the second movable member, means for causing said second block to move along its pathway in response to variation in another of the conditions of current flow, a third movable member, the second movable member and the second block being provided with co-operating means effective throughout a greater or less portion of a unit of travel of the second movable member, according to the position of the said block along its pathway, and adapted to impart movement to the third movable member.

3. In an electric meter and in combination with an electric circuit, a movable member, a block movable along a pathway transverse to the direction in which said member moves, means for causing the said block to move along such pathway in response to variation in one of the conditions of flow of current in the said circuit, a second movable member, movable means for uniting the second movable member to the first that when united they shall move in unison, the first of said movable members and its said companion block being provided with co-operating means effective through a greater or less portion of a unit of travel of the first movable member, according to the position of the said block along its pathway, for effecting movement of said uniting means, a second block movable along a pathway transverse to the direction of the movement of the second movable member, means for causing said second block to move along its pathway in response to variation in another of the conditions of flow of current in the said circuit, a third movable member, movable means for uniting the second and the third of said movable members that when united they shall move in unison, the second of said movable members and its companion block being provided with co-operating means effective throughout a greater or less portion of a unit of travel of the second movable member, according to the position of the said second block along its pathway, for moving the uniting means last named.

4. In a watt meter, and in combination with an electric circuit, a tally, a constantly rotating member, and driving means arranged between said constantly rotating member and said tally, two make-and-break devices included in said driving means, means for subjecting one of said make-and-break devices to variation in the strength of current flowing in said circuit, and means for subjecting the other of said make-and-break devices to variation in the voltage of current flowing in said circuit.

5. In a watt meter, and in combination with an electric circuit, a tally, a constantly rotating member, a rotatable member interposed between said constantly rotating member and said tally, means effective during a greater or less portion of a rotation of said constantly rotating member, according to variation in the strength of current flowing in said circuit, for uniting the said rotatable member with said constantly rotating member, and means effective during a greater or less portion of a rotation of said rotatable member, according to variation in the voltage of current flowing in said circuit, for uniting the said tally with said rotatable member.

6. An electric meter including, in combination with an electric circuit, a rotatable cylinder, a block movable longitudinally of and adjacent to the face of said cylinder, means for causing said block to move in response to variation in one of the conditions of current flow in said circuit, a second rotatable cylinder arranged coaxially with the first, intermittently effective means for uniting the two cylinders for rotation in unison, such means being subject to the control of the said block and being effective during a greater or less portion of a rotation of the first cylinder, according to the position of the said block relatively to the first cylinder, a second block movable longitudinally of and adjacent the face of the second cylinder, means for causing the said second block to move in response to variation in another of the conditions of current flow, a movable member, and intermittently effective means for imparting movement to such movable member, such means being subject to the control of the said second block and being effective during a greater or less portion of a rotation of the second cylinder, according to the position of the said second block relatively to the second cylinder.

In testimony whereof I have hereunto set my hand.

ARCHER E. YOUNG.